United States Patent [19]

Yates, III et al.

[11] Patent Number: 4,574,144

[45] Date of Patent: Mar. 4, 1986

[54] SULFONATED POLYIMIDES AND POLYAMIC ACIDS AND METHOD FOR THEIR PREPARATION

[75] Inventors: John B. Yates, III, Clifton Park; David J. Smith, Schoharie, both of N.Y.

[73] Assignee: General Electric Company, Schenectady, N.Y.

[21] Appl. No.: 682,202

[22] Filed: Dec. 17, 1984

[51] Int. Cl.[4] .............................................. C08L 77/12
[52] U.S. Cl. .................................. 525/435; 525/434; 525/436
[58] Field of Search ....................... 525/435, 436, 434

[56] References Cited

U.S. PATENT DOCUMENTS 4,017,555 4/1977 Alvarez ............................. 525/436

OTHER PUBLICATIONS

Gilbert, *Sulfonation and Related Reactions* (New York: Interscience Publishers, 1965), 15–16.
Noshay et al., *J. Appl. Polymer Sci.*, 20, 1885–1903, (1976).

*Primary Examiner*—Lester L. Lee
*Attorney, Agent, or Firm*—William H. Pittman; James C. Davis, Jr.; James Magee, Jr.

[57] ABSTRACT

Sulfonated polyimides and polyamic acids, particularly polyetherimides, are prepared by reacting the unsulfonated polymer with a mild sulfonating agent. Illustrative sulfonating agents are the complexes of sulfur trioxide and trialkyl or triaryl phosphates, especially the sulfur trioxide-triethyl phosphate complex having a molar ratio of sulfur trioxide to triethyl phosphate of 2:1.

17 Claims, 9 Drawing Figures (I) 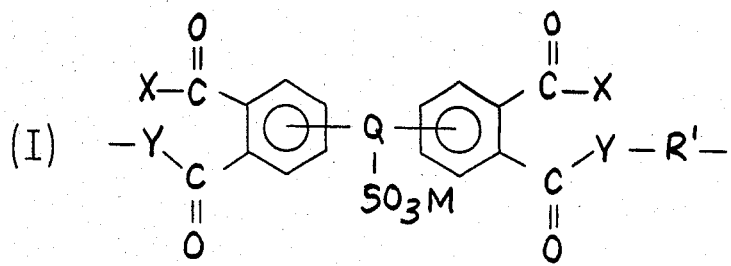
(II) 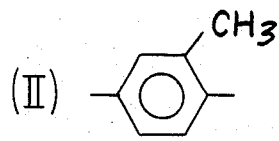
(III) 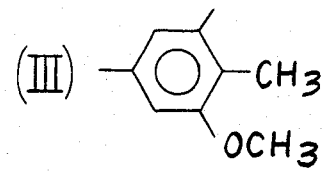
(IV) 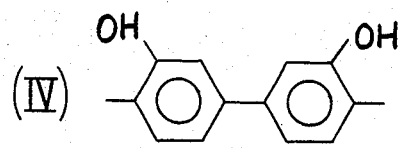
(V) 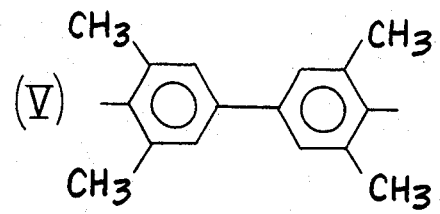
(VI) 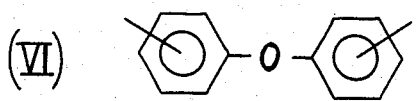
(VII) 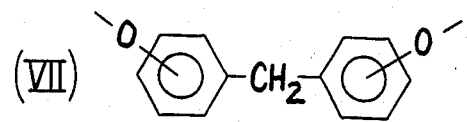
(VIII) 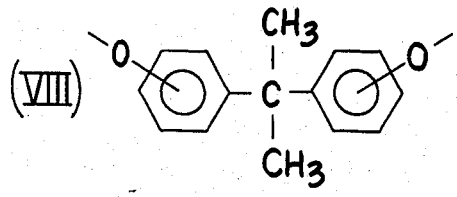
(IX) 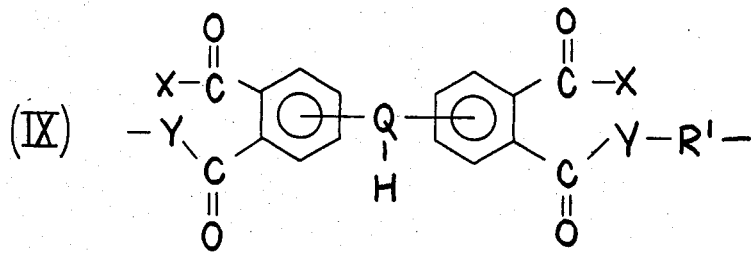

SULFONATED POLYIMIDES AND POLYAMIC ACIDS AND METHOD FOR THEIR PREPARATION

This invention relates to ionomeric polyimides and polyamic acids, and more particularly to sulfonated polymers of this type and a method for their preparation.

Polyimides, generally prepared by the reaction of tetracarboxylic acids or their dianhydrides with diamines, are a well known class of condensation polymers usually characterized by high thermal stability and solvent resistance. They include the class of polyetherimides which are prepared from dianhydrides containing ether groups, most often from 2,2-bis[4-(3,4-dicarboxyphenoxy)phenyl]propane dianhydride (hereinafter "bisphenol A dianhydride"). The corresponding polyamic acids are frequently used as intermediates in polyimide preparation.

Ionomers, or polymers containing ionic substituents, are also well known and find utility in a number of applications. In particular, it has been found that the impact resistance of many aromatic polymers can be improved by blending them with an ionomer such as a sulfonated elastomer and, as a compatibilizing agent, an ionomeric aromatic polymer similar to the base polymer. Reference is made, for example, to copending, commonly assigned application Ser. No. 619,433, filed June 11, 1984, the disclosure of which is incorporated by reference herein. In view of the foregoing, it is of interest to prepare ionomeric polyimides and in particular sulfonated polyimides.

A principal object of the present invention, therefore, is to provide ionomeric polyimides and polyamic acids and a method for their preparation.

A further object is to provide sulfonated polymers of this type which may be prepared by a relatively simple method and which have potential for use in a wide variety of ionomer applications, including those requiring ionomers.

Other objects will in part be obvious and will in part appear hereinafter.

In one of its aspects, the present invention is directed to sulfonated polymers comprising structural units having formula I in the drawings, wherein M is one equivalent of a cation; Q is a divalent radical comprising at least one aromatic ring substituted with at least one activating group toward electrophilic aromatic substitution; $R^1$ as an aromatic hydrocarbon radical containing about 6-20 carbon atoms or a halogenated derivative thereof, an alkylene or cycloalkylene radical containing about 2-20 carbon atoms, or a bis-alkylenepoly(dialkylsiloxane) radical; X is OH and Y is NH, or X and Y taken together are N.

As indicated by formula I, the sulfonated polymers of this invention may be sulfonic acids, wherein M is hydrogen, or salts, wherein M may be a metal cation such as sodium, potassium, calcium, zinc, ammonium, an amine cation or a quaternary ammonium cation. Preferably, M is hydrogen, sodium or zinc.

The Q value is a divalent radical containing, in addition to the sulfonate group, an aromatic and a substituent moiety. The aromatic moiety is at least one and preferably 1–2 aromatic rings which may be linked, fused or separated by or attached to other moieties including, for example, oxygen or nitrogen atoms. The aromatic rings are usually hydrocarbon (i.e., benzene) rings.

The substituent moiety is at least one and usually 1–3 groups with an activating effect toward electrophilic aromatic substitution. A general description and identification of such groups may be found in Morrison and Boyd, *Organic Chemistry*, Third Edition, page 342 (section 11.5). Typical activating groups include amino, hydroxy, alkoxy, aryloxy, alkyl and aryl. Since amino groups might interfere with the formation of the polyimide, the activating groups most often present in the polymers of this invention are hydroxy, alkoxy, aryloxy, alkyl and aryl. The aryloxy and alkyl radicals are preferred by reason of their inherent presence in the bisphenol A dianhydride molecule.

The activating groups may be ordinary substituents on the aromatic ring(s). Alternatively, they may be polyvalent groups such as alkylene radicals or ether oxygen atoms linking one or more aromatic rings with each other or with other parts of the molecule.

The types of radicals suitable for use as Q values are illustrated by formulas II–VIII in the drawings, with formulas VI–VIII illustrating radicals in which the activating groups are linking groups. The free valence bonds, where designated without a position indication, are usually meta or para and preferably para to the other aromatic ring or linking group. Particularly preferred is the radical of formula VIII with both oxygen atoms in para positions, which is present in bisphenol A dianhydride.

The $R^1$ value is as previously defined and may be considered as being derived from a diamine of the formula $H_2N-R^1-NH_2$. Examples of suitable $R^1$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethylbenzidine, 3,3'-dimethoxybenzidine, 1,5-diaminonaphthalene, bis(4aminophenyl)methane, bis(4-aminophenyl)propane, 2,4-bis($\beta$amino-t-butyl)toluene, bis(p-$\beta$-methyl-o-aminopentyl)benzene, 1,3-diamino-4-isopropylbenzene, bis(4-aminophenyl)sulfone, bis(4-aminophenyl)ether and 1,3-bis(3-aminopropyl)tetramethyldisiloxane. Mixtures of these $R^1$ values may also be present. Preferably, $R^1$ is an aromatic hydrocarbon radical; the m-phenylene and bis(4-phenylene)methane radicals are particularly preferred.

The sulfonated polymers of this invention may contain polyimide linkages, wherein X and Y together form N; polyamic acid linkages, wherein X is OH and Y is NH; or a mixture thereof. As noted herein, the polyamic acids are generally obtained as intermediates in polyimide preparation and the polyimides are preferred as the final products.

Methods for the preparation of polyimides and polyamic acids by the reaction of dianhydrides with diamines are known in the art. A somewhat different method, comprising the reaction of a diamine with a bisimide of an amine containing an electron-deficient radical, is disclosed in copending, commonly assigned application Ser. No. 505,636, filed June 20, 1983, the disclosure of which is incorporated by reference herein.

The polymers of this invention may be prepared by reacting a polymer comprising structural units having formula IX with a mild sulfonating agent. A number of such sulfonating agents are known in the art. Particularly useful according to the present invention are complexes of sulfur trioxide with phosphate esters having the formula $(R^2O)_3PO$, wherein $R^2$ is a lower alkyl or lower aryl radical, the term "lower" meaning that it contains up to 7 carbon atoms. Illustrative $R^2$ values are methyl, ethyl, 1-propyl, 2propyl, 1-pentyl and phenyl. The preferred $R^2$ radicals are alkyl radicals having up to 4 carbon atoms, especially straight chain alkyl radicals and most preferably the ethyl radical.

Sulfur trioxide complexes of the aforementioned phosphate esters containing 1 and 2 moles of sulfur trioxide per mole of phosphate ester are known. In the case of triphenyl phosphate, the initial portion of sulfur trioxide ordinarily sulfonates one or more of the phenyl radicals to yield sulfophenyl radicals. In most instances, the equimolar sulfur trioxide-phosphate ester complexes are such mild sulfonating agents that their use requires severe conditions of temperature, pressure or the like. Therefore, the use of complexes having a molar ratio of sulfur trioxide to phosphate ester of 2:1 is preferred. The procedures and conditions described hereinafter refer to the use of such 2:1 complexes.

The polymers which may be sulfonated according to this invention generally have weight average molecular weights (as determined by gel permeation chromatography) up to about 3,000,000, preferably about 10,000–100,000 and most desirably about 20,000–80,000.

The preparation of the sulfonated polymers is generally effected by merely contacting the polymer with the sulfur trioxide complex at a temperature within the range of about 10°–50° C., preferably about 20°–40° C. Only one mole of sulfur trioxide per mole of complex is utilized for sulfonation under these conditions, with the remainder being converted to sulfuric acid.

It is preferred to employ a diluent for the polymer and complex. The diluent should be resistant to sulfonation, and this generally rules out aromatic solvents. It is possible to use aliphatic and alicyclic materials such as hexane, heptane and cyclohexane, but such materials ordinarily do not dissolve the polymer and therefore should be used alone only when surface sulfonation is desired. This may be effected, for example, by forming a slurry of polymer particles in a combination of complex and aliphatic solvent. For more complete sulfonation, a solvent comprising (at least in part) at least one chlorinated aliphatic hydrocarbon such as chloroform or 1,2-dichloroethane is preferred. Such chlorinated materials may, if desired, be used in combination with aliphatic hydrocarbons of the type previously described.

The above-described procedure produces the free sulfonic acids. They may be converted to salts, either simultaneously with preparation or in a subsequent step, by conventional reaction with neutralizing agents such as metal oxides, hydroxides or carbonates, ammonia and amines. Since the 2:1 sulfur trioxide complex generates one mole of sulfuric acid, it is necessary to employ enough neutralizing agent to convert said sulfuric acid to the corresponding sulfate salt. In addition, it is frequently necessary to wash the sulfonated polymer thoroughly with a polar liquid such as water or an alcohol to remove entrained sulfuric acid or sulfate salt. Extraction conditions are frequently advisable for such washing. After washing, the sulfonated polymer typically has a sulfonate content corresponding to about 1–3% sulfur.

Either polyimides or polyamic acids may be sulfonated by the method of this invention. When it is used for polyamic acids, the acid group may react with sulfur trioxide to form a sulfate ester group, which may in turn react to form products other than the sulfonated polyamic acid. Therefore, it is preferred to sulfonate polyimides.

The sulfonation of polyimides according to this invention is illustrated by the following example.

EXAMPLE 1

A 2:1 sulfur trioxide-triethyl phosphate complex was first prepared by adding 3.38 grams (42.2 mmol.) of sulfur trioxide dropwise under nitrogen at 0° C., with stirring, to a solution of 3.85 grams (21.1 mmol.) of triethyl phosphate in 300 ml. of 1,2-dichloroethane. Stirring was continued for 15 minutes, after which the complex solution was added to a solution in 3.5 liters of 1,2-dichloroethane of 125 grams (211 mmol. based on structural units) of a polyetherimide having a number averge molecular weight (as determined by gel permeation chromatography) of about 23,000, prepared by the reaction of substantially equimolar amounts of bisphenol A dianhydride and m-phenylenediamine. Addition was effected rapidly at room temperature, with stirring which was continued for 30 minutes. 2-Propanol, 150 ml., was then added and the turbid solution was stirred until clear. The solution was concentrated under vacuum to about 1.5 liters and poured into 10 liters of methanol, whereupon the sulfonated polymer precipitated. It was removed by filtration, extracted in a Soxhlet extractor with water for six hours and dried in a vacuum oven at 80° C. The dried product contained 1.55% sulfur, as compared with a calculated value of 2.27%.

The polymers of this invention have properties similar to those of corresponding polyimides containing no sulfonic acid groups. Thus, they may be used similarly, either alone or in combination with conventional polyetherimides to increase still further their solvent resistance. Typical uses are in the formation of films, molding compounds, coatings and the like, in such areas of application as automobile and aviation applications for decorative and protective purposes, high temperature electrical insulators and dielectric capacitors, coil and cable wrappings, containers and container linings, laminating structures for application as films to various heatresistant or other types of materials, and filled compositions where the fillers may be asbestos, mica, glass fiber or the like. Other uses include as binders for asbestos fibers, carbon fibers and other fibrous materials making brake linings, and for formulation of molding compositions using fillers such as asbestos, glass fibers, talc, quartz, wood flour, finely divided carbon and silica. Still other uses for polyimides are described in a large number of United States patents.

The compositions of this invention, especially those in the salt form, are also useful as compatibilizers for impact-modified blends of substantially aromatic polymers such as polycarbonates, polyphenylene oxides, saturated aromatic polyesters and polyetherimides with ionomeric elastomers, as described in the aforementioned application Ser. No. 619,433. An illustration of this utility is provided by the following example.

EXAMPLE 2

A blend is prepared from the following:

82 parts of a polyetherimide having a molecular weight of about 20,000 and an intrinsic viscosity in chloroform at 25° C. of 0.47 dl./g., prepared by the reaction of approximately equimolar quantities of bisphenol A dianhydride and m-phenylenediamine.

9 parts of the zinc salt of a sulfonated EPDM rubber having a number average molecular weight of about 50,000 and containing an average of 13 sulfonate groups per molecule.

9 parts of the zinc salt of the product of Example 1, prepared by neutralizing said product with a solution of zinc acetate in aqueous methanol.

The composition is prepared by blending the above, mixing in a jar mill for 2 hours and extruding on a twin screw extruder. The extruded material is quenched in water, pelletized and dried.

What is claimed is:

1. A sulfonated polymer comprising structural units having formula I in the drawings, wherein M is one equivalent of a cation; Q is a divalent radical comprising at least one aromatic ring substituted with at least one activating group toward electrophilic aromatic substitution; $R^1$ is an aromatic hydrocarbon radical containing about 6–20 carbon atoms or a halogenated derivative thereof, an alkylene or cycloalkylene radical containing about 2–20 carbon atoms, or a bis-alkylenepoly(dialkylsiloxane) radical; X is OH and Y is NH, or X and Y taken together are N.

2. A polymer according to claim 1 wherein X and Y taken together are N.

3. A polymer according to claim 2 in which Q has formula VIII with both oxygen atoms in para positions.

4. A polymer according to claim 3 wherein $R^1$ is m-phenylene or bis(4-phenylene)methane.

5. A polymer according to claim 4 which has a weight average molecular weight within the range of about 10,000–100,000.

6. A polymer according to claim 5 which has a sulfonate content corresponding to about 1–3% sulfur.

7. A polymer according to claim 6 wherein M is hydrogen.

8. A polymer according to claim 6 wherein M is alkali metal.

9. A method for preparing a sulfonated polymer according to claim 1 wherein M is hydrogen which comprises reacting a polymer comprising structural units having formula IX with a mild sulfonating agent.

10. A method according to claim 9 wherein X and Y taken together are N.

11. A method according to claim 10 wherein the sulfonating agent is a complex of sulfur trioxide with a phosphate ester having the formula $(R^2O)_3PO$, wherein $R^2$ is a lower alkyl or lower aryl radical; and wherein the sulfonation is effected at a temperature within the range of about 10°–50° C.

12. A method according to claim 11 wherein $R^2$ is an alkyl radical having up to 4 carbon atoms.

13. A method according to claim 12 in which Q has formula VIII with both oxygen atoms in para positions.

14. A method according to claim 13 wherein $R^1$ is m-phenylene or bis(4-phenylene)methane.

15. A method according to claim 14 wherein the sulfonating agent is a sulfur trioxide-triethyl phosphate complex having a molar ratio of sulfur trioxide to triethyl phosphate of 2:1.

16. A method according to claim 15 wherein the sulfonation reaction is effected at a temperature within the range of about 20°–40° C.

17. A method according to claim 16 wherein the polymer has a weight average molecular weight within the range of about 10,000–100,000.

* * * * *